(12) United States Patent
Kraut-Reinkober et al.

(10) Patent No.: US 11,514,811 B2
(45) Date of Patent: Nov. 29, 2022

(54) METHOD FOR GENERATING AT LEAST ONE RECIPE SUGGESTION, KITCHEN APPLIANCE AND SYSTEM FOR PREPARING FOOD

(71) Applicant: Vorwerk & Co. Interholding GmbH, Wuppertal (DE)

(72) Inventors: Stefan Kraut-Reinkober, Leverkusen (DE); Andrej Mosebach, Bochum (DE); Mirco Pieper, Wuppertal (DE); Christiane Stach, Radevormwald (DE); Wenjie Yan, Düsseldorf (DE); Sarah Werhahn, Zürich (CH)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 325 days.

(21) Appl. No.: 16/841,987

(22) Filed: Apr. 7, 2020

(65) Prior Publication Data

US 2020/0342781 A1     Oct. 29, 2020

(30) Foreign Application Priority Data

Apr. 24, 2019  (EP) .................................... 19170838

(51) Int. Cl.
*G09B 19/00* (2006.01)
*A47J 36/32* (2006.01)
*G06Q 10/08* (2012.01)

(52) U.S. Cl.
CPC ............ *G09B 19/00* (2013.01); *A47J 36/321* (2018.08); *G06Q 10/087* (2013.01)

(58) Field of Classification Search
CPC .... A47J 27/004; A47J 36/321; A47J 43/0716; G06Q 10/087; G09B 19/00
See application file for complete search history.

(56) References Cited

U.S. PATENT DOCUMENTS

| 7,709,309 | B2* | 5/2010 | Moriwaka ........... H01L 21/2026 438/166 |
| 7,772,523 | B2* | 8/2010 | Tanaka ................ H01L 21/0242 219/121.73 |
| 8,381,982 | B2* | 2/2013 | Kunzig ..................... G01S 5/16 235/462.08 |

(Continued)

FOREIGN PATENT DOCUMENTS

| DE | 102013106865 A1 | 1/2015 |
| EP | 3069643 A1 | 9/2016 |

OTHER PUBLICATIONS

Office Action for European Patent Application No. 19 170 838.7, dated Jan. 19, 2022, and its English summary, 5 pages.

(Continued)

*Primary Examiner* — Thien M Le
(74) *Attorney, Agent, or Firm* — Rudy J. Ng; Bret E. Field; Bozicevic, Field & Francis LLP

(57) ABSTRACT

The invention relates to a method (100) for generating at least one recipe suggestion (230) when using a kitchen appliance (10) for preparing food, comprising the following steps:

Figure 1:
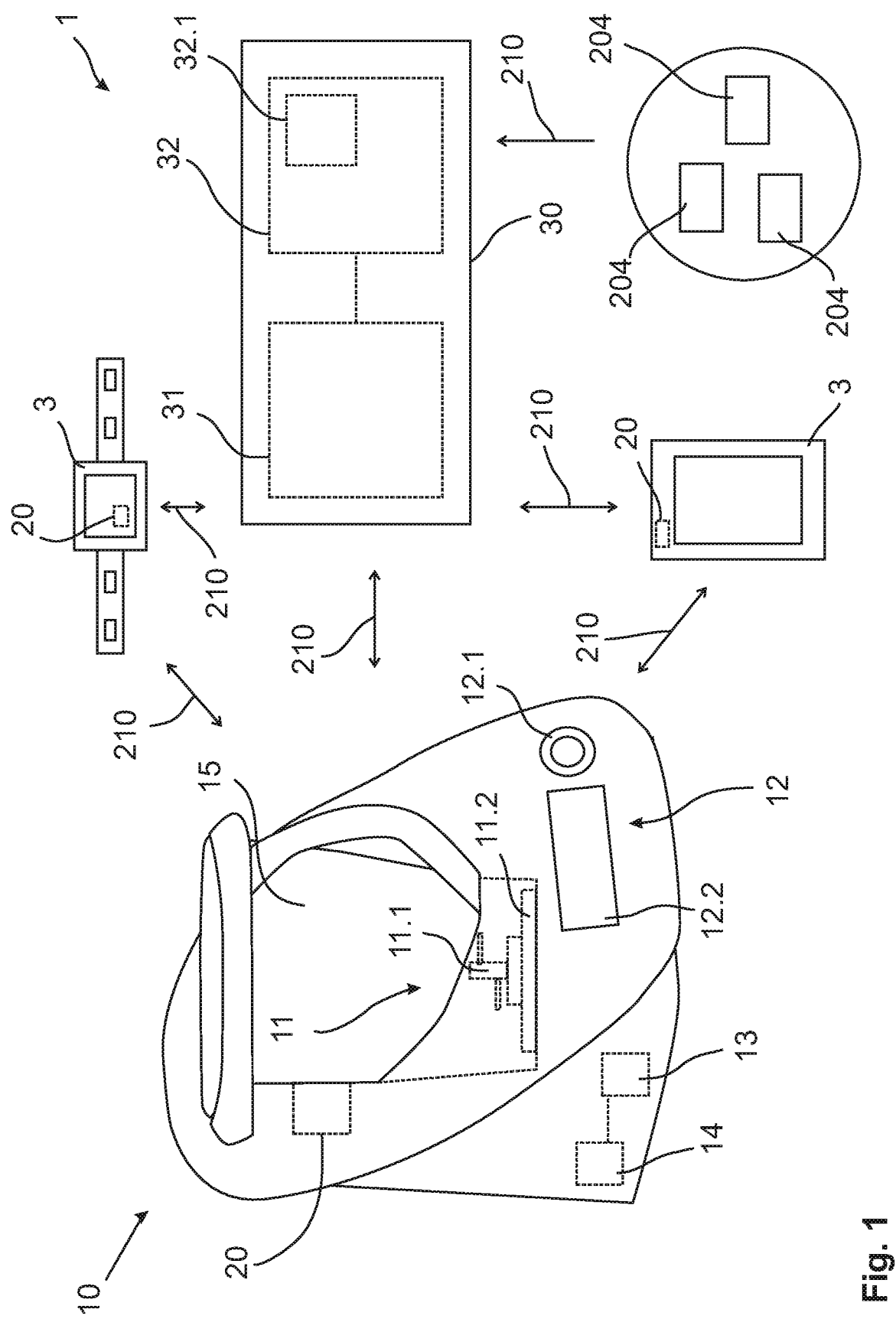

Detection (102) of food data (210), especially on the kitchen appliance (10),

Assigning (103) the food data (210) to a data history (220) of a user profile (200).

Furthermore, the invention relates to a kitchen appliance (10) for preparing food and a system (1) for preparing food comprising a kitchen appliance (10).

16 Claims, 4 Drawing Sheets

(56) References Cited

U.S. PATENT DOCUMENTS

| | | | | |
|---|---|---|---|---|
| 2008/0224831 A1* | 9/2008 | Arai | ............ | H04B 5/0012 |
| | | | | 340/10.51 |
| 2009/0255995 A1* | 10/2009 | Shionoiri | ............ | H01L 27/1266 |
| | | | | 235/492 |
| 2011/0134680 A1* | 6/2011 | Saito | ............ | H01L 27/1288 |
| | | | | 365/104 |
| 2012/0087065 A1* | 4/2012 | Kim | ............ | H04B 15/02 |
| | | | | 361/679.01 |
| 2019/0164117 A1* | 5/2019 | Wallace | ............ | H04L 12/2829 |
| 2020/0395652 A1* | 12/2020 | Mityashin | ............ | H01Q 1/526 |

OTHER PUBLICATIONS

Office Action for European Application No. 19170838.7 dated Jul. 22, 2021, with its English summary, 5 pages.

\* cited by examiner

METHOD FOR GENERATING AT LEAST ONE RECIPE SUGGESTION, KITCHEN APPLIANCE AND SYSTEM FOR PREPARING FOOD

The invention relates to a method for generating at least one recipe suggestion, a kitchen appliance for preparing food and a system for preparing food with a kitchen appliance.

From the state of the art are known kitchen machines, which are used for preparing food. Such kitchen appliances can have different degrees of automation, whereby, for example, depending on recipe data, food can be chopped and/or cooked to prepare the food. Due to this close connection between the actual cooking method and the recipe, e.g. available as a data record, it is basically possible to integrate the recipe selection further and further into the kitchen appliance. This can simplify the cooking method for a user, since the user does not need to enter certain data into the kitchen appliance and the cooking method can lead to reproducible results. Normally, a user will only execute recipes that suit their taste. In order to simplify recipe selection for the user, it is therefore desirable to be able to take into account the specific preferences of a user when selecting the recipes provided.

From DE 10 2013 106 865 A1, for example, it is known to identify a user at the kitchen appliance and to display their preferred recipes. To further simplify the selection of recipes for the user, it is also desirable to configure the selection of such preferred recipes intelligently and individually for the user.

It is an object of the present invention to remedy, at least in part, any prior disadvantages known from the prior art. In particular, it is an object of the present invention to simplify the selection of a recipe for a user of a kitchen appliance, in particular with regard to their individual preferences.

The preceding object is solved by a method with the characteristics of the independent method claim, a kitchen appliance with the characteristics of the independent device claim and a system for preparing food with the characteristics of the independent system claim. Further features and details of the invention result from the dependent claims, the description and the drawings. Features and details which have been described in connection with the method according to the invention are of course also valid in connection with the kitchen appliance and/or the system according to the invention and vice versa, so that with regard to the disclosure of the individual aspects of the invention, reference is or can always be made to each other.

According to the invention, the method for generating at least one recipe suggestion, in particular recipe suggestions, when using a kitchen appliance for preparing food comprises the following steps:

Detection of food data, especially on kitchen appliances,
Assigning the food data to a data history of a user profile,
Detect a behavior pattern of the user profile depending on the data history,
Determination of at least one recipe suggestion depending on the pattern of behavior,
Providing the at least one recipe suggestion on the kitchen appliance.

Preferably, the method steps are performed in the order listed.

In particular, the kitchen appliance is a kitchen appliance, cooker-mixer or intelligent oven for at least partially automated processing of recipes. The food data may preferably include ingredients, such as the presence of tomatoes or a portion of tomatoes, spices, water or the like in a recipe. Furthermore, the food data may include pattern data of ingredients and/or recipes, such as "salt-free", "vegan", "organic" and/or the like. In this context, the detection of food data may include detection of the ingredients actually put into the kitchen appliance and/or at least one recipe retrieved by the user. It is also conceivable that a food prepared on the kitchen appliance may be detected during preparation, before preparation and/or after preparation in order to perform the detection of food data. Preferably, a user profile may be retrieved first in order to be able to assign the food data directly to the data history of the user profile. It is also conceivable that the entry of food data is performed for a dish that is or was prepared on another kitchen appliance under the user profile. Thus, the method for generating at least one recipe suggestion, especially recipe suggestions, can be performed across devices, especially if the user frequently prepares their food on different devices. The data history can, in particular, comprise a list or the like in which the food data is stored in order to be able to detect the behavioral pattern of the user profile from it. The detection of the behavior pattern of the user profile as a function of the data history can thus comprise in particular an analysis of the data history, preferably analyzing the preferences of the user with regard to the selection of their meals, foods and/or ingredients. Finally, based on this analysis, the at least one recipe suggestion can be determined as a function of the behavior pattern. It is conceivable, for example, that upon detection of the behavioral pattern, it is determined that the user prefers vegan food, so that a vegan recipe is selected for determining the at least one recipe suggestion. The provision of the at least one recipe suggestion on the kitchen appliance can preferably include that the recipe suggestion on the kitchen appliance is made usable for the user, i.e. that it can be executed at least partially automated on the kitchen appliance. In particular, the recipe suggestion can be displayed for the user, for example, at a user interface of the kitchen appliance. Further confirmation by the user may be required for the actual execution of the recipe suggestion on the kitchen appliance. By making the recipe suggestion available, especially by displaying it on the kitchen appliance, the user can be presented with the recipe suggestion in a particularly convenient way, so that he or she can use the kitchen appliance conveniently to execute the recipe.

In particular, the method according to the invention creates an intelligent and individual selection of a recipe suggestion. Thus, the recipe suggestion can at least partially control the recipe selection or the diet of the user in their sense. In particular, data available at least partially on the basis of the data history by means of the detection of the behavior pattern are used to analyze the user's taste and to generate the at least one recipe suggestion on the basis thereof. This enables, for example, the user to be presented with a recipe suggestion that is completely new and individually tailored to their needs. In particular, by detecting the behavior pattern, conclusions can be drawn about the user's eating habits, illnesses, allergies, cooking expertise and/or the composition of their household. In this way, for example, a user's inhibition threshold to try out new recipes can be lowered. This intelligent selection can be controlled by the user profile. The user profile can, for example, be password-protected so that only a certain user or a certain user group can access it. It is also conceivable that the user profile is assigned to a specific kitchen appliance and can therefore represent the behavior pattern of a household, for example. In this way, the detection of the behavior pattern can be realized in a way that over time, by increasing the number of recipes and/or repetitions, i.e. especially the data history, the method and/or the system can be self-learning.

Furthermore, it is conceivable in a method according to the invention that the detection of the behavior pattern of the user profile includes the detection of repetitions in the data history. The repetitions can refer to individual recipes, so that a user's particularly preferred recipes are detected if, for example, the user repeats the recipes several times within a certain period of time. Furthermore, a quantitative estimation of the behavior pattern can also be made. If, for example, a recipe has more repetitions than another recipe, it can be concluded that the recipe with more repetitions is more popular with the user. Furthermore, it is conceivable that the repetitions refer e.g. to pattern data of ingredients and/or products, so that e.g. a repeated use of vegan recipes can lead to a user being presented with more vegan recipe suggestions. Within the scope of the invention it is further conceivable that the detection of the behavior pattern and/or the determination of the recipe suggestion comprises a comparison of the data history with at least one further data history assigned to at least one further user profile. The comparison may in particular comprise a big data analysis. Thus, the detection of the behavior pattern and/or the determination of the recipe suggestion can comprise an analysis of data records of different users. In this way, it can be determined, for example, which recipes are preferred by other users who have a similar data history to the user profile whose behavior pattern is to be detected or for which a recipe suggestion is to be determined, using the other user profiles or the data histories assigned to the other user profiles. Thus, a lot of data can be used to improve and/or specify the prediction or estimation of the user's taste. Preferably, the comparison or analysis with other user profiles is performed exclusively anonymously, since the aim is not to query the data of a specific user, but of a user with similar eating and cooking habits. This comparison can, for example, be based on the same common food use or the same common recipes.

Furthermore, in a method according to the invention, it is conceivable that several recipe suggestions are determined depending on the behavior pattern, in particular wherein the several recipe suggestions are provided on the kitchen appliance for selection of one of the recipe suggestions by the user or wherein one of the recipe suggestions is automatically selected and provided on the kitchen appliance. When determining the at least one recipe suggestion as a function of the behavioral pattern, it can result that several recipe suggestions are possible for the preferences of the user. If these are provided on the kitchen appliance for selection of the recipe suggestion by the user, the user can decide for himself which recipe suggestion he prefers at that moment. An automatic selection of a recipe suggestion from the several recipe suggestions can, for example, take place depending on existing ingredients, the popularity of the recipe suggestion with other user profiles and/or other criteria.

Preferably, the recipe suggestions can be assigned to the user profile in a suggestion list, especially where the suggestion list comprises a defined recipe sequence. The assignment of the recipe suggestions to the suggestion list of the user profile may, for example, require the user to confirm all recipe suggestions and/or individual recipe suggestions. The suggestion list can thus be a kind of playlist for recipes based on the user's taste or user profile. In particular, the suggestion list can be dynamically adjusted when the user enters additional food data so that it can be added to the data history. It is also conceivable that when processing the suggestion list, the user can evaluate the individual recipe suggestions in order to improve the detection of the behavior pattern of the user profile. It is also conceivable, for example, that several suggestion lists are generated for the user profile, each of which can be assigned to a season, a sport, a user status, such as "vacation", or similar. In this way, a simple possibility can be created to submit different recipe suggestions to a user and at the same time to enable him to easily purchase ingredients in advance to process several recipe suggestions.

Furthermore, in the case of a method according to the invention, it is conceivable that the user profile comprises an identification of a kitchen appliance and/or a user device and/or that a user group, in particular a household, is assigned to the user profile. The identification of the kitchen appliance can be performed, for example, by transmitting a serial number of the kitchen appliance to a server. Furthermore, it is conceivable that the user logs on to the kitchen appliance and/or the user device, e.g. by entering a user name and/or a password, in order to confirm their identity. In this way, the kitchen appliance and/or the user device can be assigned to the user profile, so that future activities on the kitchen appliance and/or with the user device can be incorporated into the data history. The user device can be a smartphone, a tablet and/or the like. Furthermore, it can be provided that several user groups can be assigned to the user profile, e.g. in the form of further, dependent user profiles. It is conceivable, for example, that the user profile includes a household to which both parents and children are present. The user profile can be managed as a whole, so that, for example, the detection of the behavior pattern and/or the determination of the recipe suggestion is related to the entire user profile, or it can be divided into individual users, for example, by classifying them as "adults" and "children". This may improve the detection of the behavior pattern and/or the determination of the recipe suggestion by providing the user profile with further data about the users in addition to the food data. This can also be used, for example, to compare the data history with other user profiles in order to perform the comparison for user profiles that are as similar as possible.

Preferably, in a method according to the invention, the detection of the behavior pattern of the user profile can comprise the detection of a time pattern and the recipe suggestion can be determined depending on the time pattern. Preferably, the time pattern can be compared with the calendar data of a user. The time pattern can therefore include or process a time pattern in order to be able to identify a time pattern that is, in particular, part of the behavior pattern. For example, it is conceivable that a user prefers a certain food or a certain type of food on a certain day of the week. For example, it is conceivable that the data history shows that fish is prepared every Friday using the user profile. This can be considered in the time pattern and thus in the behavior pattern in that more fish recipes are suggested on Fridays. Furthermore, it is conceivable that the time pattern includes a time, whereby it can be determined, for example, when the user usually eats their food. When determining the recipe suggestion, for example, it can be considered that less high-calorie ingredients are used when preparing food in the evening to improve the user's health. For example, a user's appointments that result from calendar dates can be considered for the prediction. The calendar data can advantageously be retrieved from a server and/or a user device of the user.

Furthermore, it is conceivable that in a method according to the invention, the user profile comprises vital data of a user, whereby the vital data are considered when detecting the behavior pattern and/or determining the recipe suggestion. Vital data may in particular comprise health data, such as the age of the user, diabetic information, such as blood sugar, a calorie requirement and/or the like. Thus, a current or estimated health condition of the user can be considered to tailor the prescription suggestion to the individual user.

The invention may also provide that the method comprises the following step:

Recording of purchased ingredients, whereby the purchased ingredients are considered when identifying the pattern of behavior and/or determining the at least one recipe suggestion. In particular, the purchased ingredients can be entered via a shopping list, which can be entered manually by the user or created automatically. Preferably the data history can be considered. The data history can show which ingredients the user has previously purchased and/or consumed. Thus, it can be avoided that recipe suggestions have a high demand for additional ingredients to be purchased.

Furthermore, in the case of a method according to the invention, it is conceivable that the method comprises the following step:

Recording of external activities, whereby the external activities are considered when detecting the behavior pattern and/or determining the at least one recipe suggestion. External activities may include, for example, finding a restaurant, eating at a friend's house and/or a sporting activity of the user. In particular, the recording of external activities can be performed via a user device. For this purpose, the location of the user device can be analyzed. Thus, it is not only possible to record the behavior pattern based on activities on the kitchen appliance, but also further preferences of the user can be recorded. If the user e.g. often eats in an Italian restaurant, this can have positive or negative effects on the recipes. A positive consideration can lead to the conclusion that the user prefers Italian dishes and thus these are preferred when determining the recipe suggestion. A negative consideration can lead to the conclusion that the user often eats Italian food and therefore prefers other types of food when preparing their own meals. In particular, the recording of external activities can provide further data that can be used to adapt the detection of the behavior pattern and thus the determination of the recipe suggestion more precisely to the user.

Furthermore, in the case of a method according to the invention, it is conceivable that the method comprises the following step:

Recording of an ingredient plan, whereby ingredient planning is considered when detecting the behavior pattern and/or determining the at least one recipe suggestion. Thus, for example, it may be intended that the user selects recipes on a user device and/or kitchen appliance that he wants to execute in the future. In particular, a shopping list from the user can be analyzed and used to determine which ingredients the user will have in stock in the future to generate the recipe suggestion. In particular, ingredient planning can be entered using planned recipes, for example, using the suggestion list. This therefore provides further data for detecting the behavior pattern. By taking ingredient planning into account, you can also improve the coordination between the recipe suggestions and the user's stocks so that ingredients can be used, especially before the expiration date.

The invention may also provide that the detection of food data includes detection of a recipe and/or identification of ingredients supplied by the kitchen appliance. The recipe can, for example, be selected by a user, preferably on the basis of a recipe suggestion, and be retrieved by a control unit of the kitchen appliance from an external medium such as a USB stick, or from a server. Furthermore, it is conceivable that the recipe is available in a storage unit of the kitchen appliance and can be retrieved internally. The identification of ingredients supplied to the kitchen appliance can preferably be performed automatically, e.g. by a sensor device of the kitchen appliance. Thus, it is conceivable that the identification of the supplied ingredients is done optically, e.g. by a camera. Furthermore, it is conceivable that the sensor device comprises an ultrasonic sensor, a radar sensor, in particular a short-range radar sensor, a molecular sensor and/or the like, in order to identify the ingredients directly. Furthermore, it is conceivable that the identification of the ingredients takes place indirectly by identifying a package of the ingredients, for example by using a barcode scanner to read a barcode on the package of the ingredients. This allows the recording of food data to be performed automatically and in a particularly simple manner on the kitchen appliance. This can improve the convenience for the user when performing the method according to the invention.

According to another aspect of the invention, a kitchen appliance is claimed for the preparation of food. The kitchen appliance has a functional unit for processing ingredients and a user interface for interaction with a user. Furthermore, the user interface is connected to an integrated control unit by which a method according to the invention can be initiated, in particular performed.

The functional unit can preferably have a mixer and/or a heating element. This means that the functional unit of the kitchen appliance allows the food to be prepared at least partially automatically, thus improving user comfort. The user interface may preferably comprise a control element, e.g. in the form of a control knob, and/or a display, preferably in the form of a touch display. This allows the user to interact with the kitchen appliance and thereby transmit commands to control the kitchen appliance to the control unit. In particular, the integrated control device is a control device integrated into the kitchen appliance, i.e. an internal control device of the kitchen appliance. Behind the initiation of the method it can be understood that the method is at least partially executed and/or triggered by the integrated control device. Thus, it can be provided that the method is at least partially executed on a server and is only triggered by the kitchen appliance or the integrated control device of the kitchen appliance. It is also conceivable, however, that the method is performed completely by the integrated control unit. Thus, a kitchen appliance according to the invention brings the same advantages as they have already been described in detail with respect to a method according to the invention. In particular, the kitchen appliance may improve the comfort of a user when preparing food and in particular when selecting the food to be prepared.

According to another aspect of the invention, a system for preparing food is claimed. The system comprises a kitchen appliance, in particular a kitchen appliance according to the invention, for preparing food, the kitchen appliance having a functional unit for processing ingredients and a user interface for interaction with a user. Furthermore, the system comprises a storage unit in which a data history of a user profile with food data can be stored. Furthermore, the system has a computing unit which is configured to detect a behavioral pattern of a user profile as a function of the data history and to determine at least one recipe suggestion as a function of the behavioral pattern, so that the at least one recipe suggestion can be provided on the kitchen appliance.

In particular, the at least one recipe suggestion may be available, preferably displayable, at the user interface of the kitchen appliance. The method according to the invention can be preferably performed at least partially by the computing unit. Thus, a system according to the invention brings the same advantages as those already described in detail with respect to a method according to the invention and/or a kitchen appliance according to the invention. In particular, the computing unit may comprise a processor, preferably a microprocessor, in order to be able to analyze the behavior pattern and determine the recipe suggestion. For this purpose, the computing unit may be connected to a storage unit or be in communication with it and thus enable data exchange.

In the context of the invention it may be provided that the system comprises a sensor device by means of which ingredients used to determine the food data can be determined, in particular wherein the sensor device comprises one of the following sensors:

Camera,
Bar code scanner,
Ultrasonic sensor,
Radar sensor, especially short-range radar sensor,
Molecular sensor.

The sensor device allows automatic identification of ingredients. In particular, the ingredients used, which can be detected by the sensor device, can be ingredients added to the kitchen appliance.

Furthermore, the invention may provide that the sensor device is integrated into the kitchen appliance and/or a user device. The sensor device can be arranged on the kitchen appliance, in particular be part of the kitchen appliance, or be provided separately from the kitchen appliance. Thus, the kitchen appliance can be operated independently from other appliances and can acquire food data autonomously. It is also conceivable that the sensor device is part of a user device, e.g. in the form of a smartphone. In particular, a camera and/or a barcode scanner of the user device can be used as a sensor device to capture food data and send it via the user device to the kitchen appliance and/or a server so that the computing unit has this data available. This allows access to extended sensor functions without the need for additional components on the kitchen appliance.

Preferably, a system according to the invention may provide that the computing unit and/or the storage unit can be in communication with another kitchen appliance for the detection of food data. Thus, it is conceivable that within the scope of the user profile several kitchen appliances are used by a user or a group of users, but all of them are to be used to collect data to determine the behavior pattern of the user profile. Thus, it is possible that the user profile is not bound to a single kitchen appliance and the user can access their data in a spatially flexible way or generate data in a spatially flexible way, which finally improves the determination of the recipe suggestion with regard to individualization for the user.

Furthermore, in a system according to the invention, it is conceivable that a server comprises the computing unit and/or the storage unit. Thus, the recipe suggestion can be transferred specifically to the kitchen appliance. Alternatively, it is conceivable that the kitchen appliance includes the computing unit and/or the storage unit. If the server includes the computing unit and/or the storage unit, the integrated control unit of the kitchen appliance can be small in size and thus require less installation space and/or lower costs. At the same time, a server offers the possibility to manage the data centrally, so that, for example, a comparison with data from other user profiles can be simplified. If the computing unit and/or the storage unit are provided in a kitchen appliance, this has the advantage that an Internet connection can be omitted and thus the full range of functions of the kitchen appliance can be used independently of such an Internet connection.

Furthermore, in a system according to the invention, it is conceivable that the kitchen appliance has an appliance interface through which the kitchen appliance can be in communication with the computing unit and/or the storage unit. In particular, the device interface can be, for example, a network interface, preferably an Internet interface, in order to connect the kitchen appliance with the network, in particular the Internet. It is therefore conceivable that the appliance interface could include a WLAN interface, Internet interface or similar. It is also conceivable that the computing unit and/or the storage unit can be in communication with the appliance interface via a direct connection. It is thus conceivable that the device interface includes a Bluetooth interface, USB interface and/or the like. In particular, it is conceivable that the computing unit and/or the storage unit are provided on a user device of the user, so that such computing capacities or storage capacities may also be usable.

Furthermore, in a system according to the invention, it may be provided that the computing unit is configured to provide a user device with at least one recipe suggestion via a communication connection. In this way, the recipe suggestion can be made available to the user, in particular in a decentralized manner, whereby this can preferably be performed in addition to the provision of the recipe suggestion on the kitchen appliance. In this way, the user can take the recipe suggestion with him, for example, to go shopping or to a restaurant so that he does not have to rely on the kitchen appliance to use the recipe suggestion. Furthermore, it is conceivable that the user can share the recipe suggestion with friends, relatives, work colleagues or the like via the user device, so that preferably other user groups can benefit and get to know a new recipe suggestion.

Figure 2:
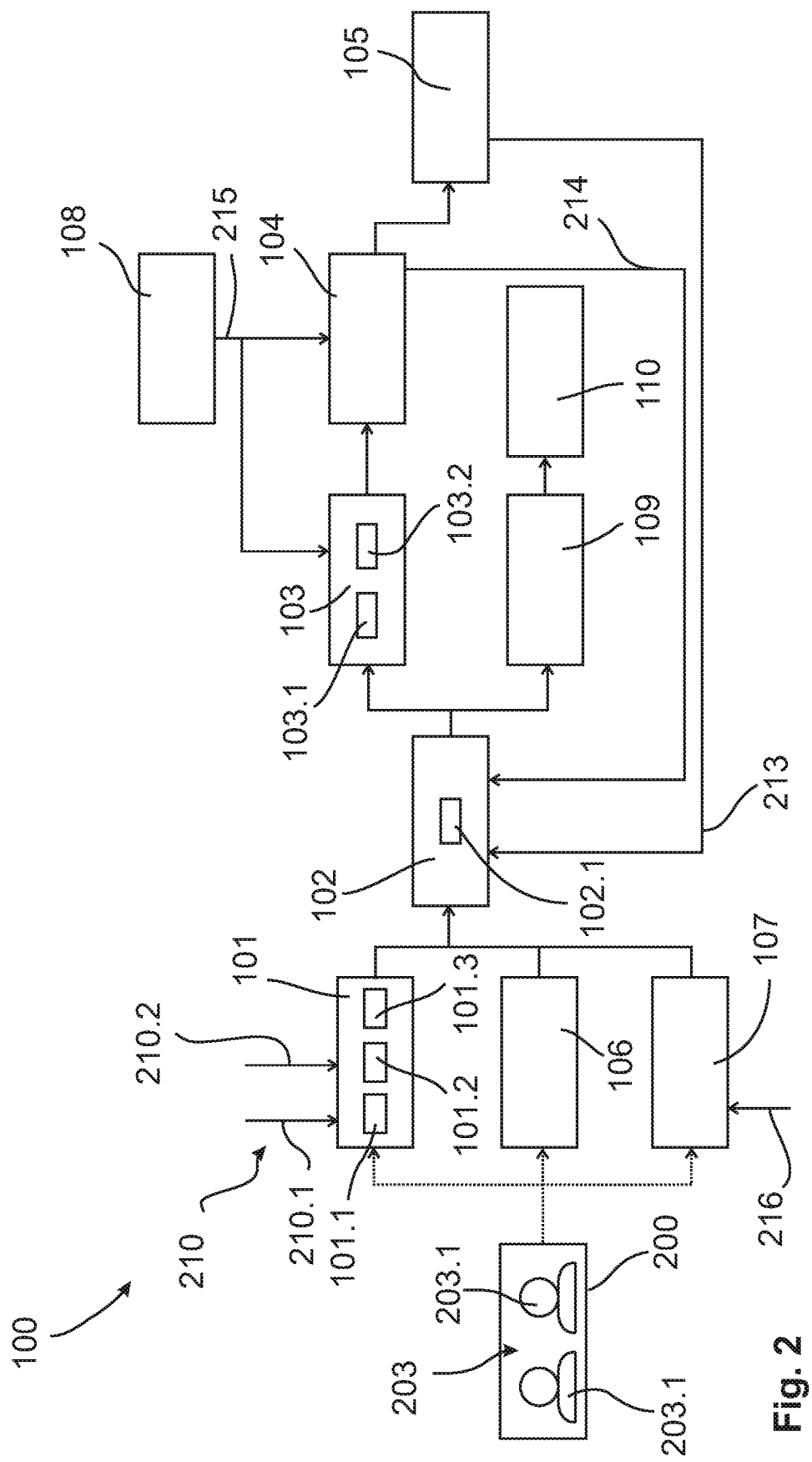
Figure 3:
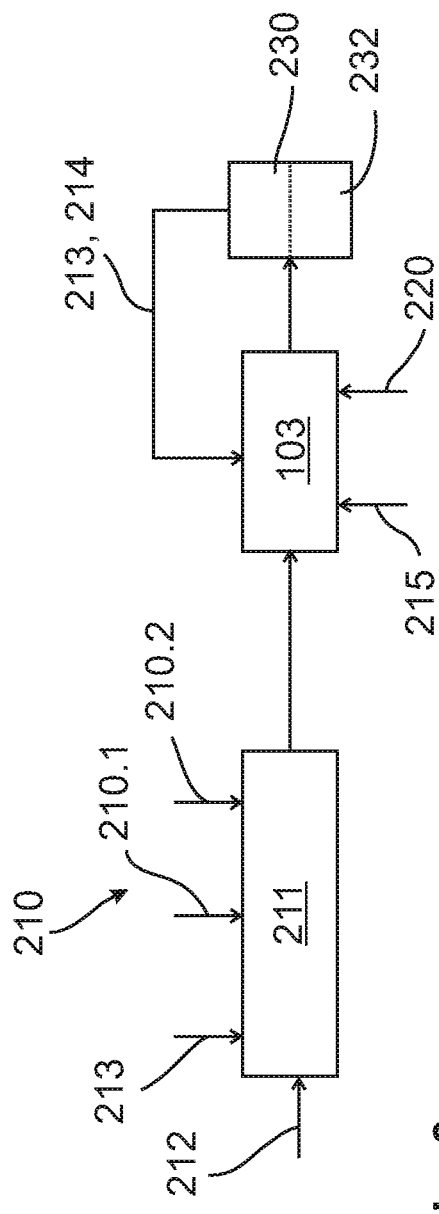
Figure 4:
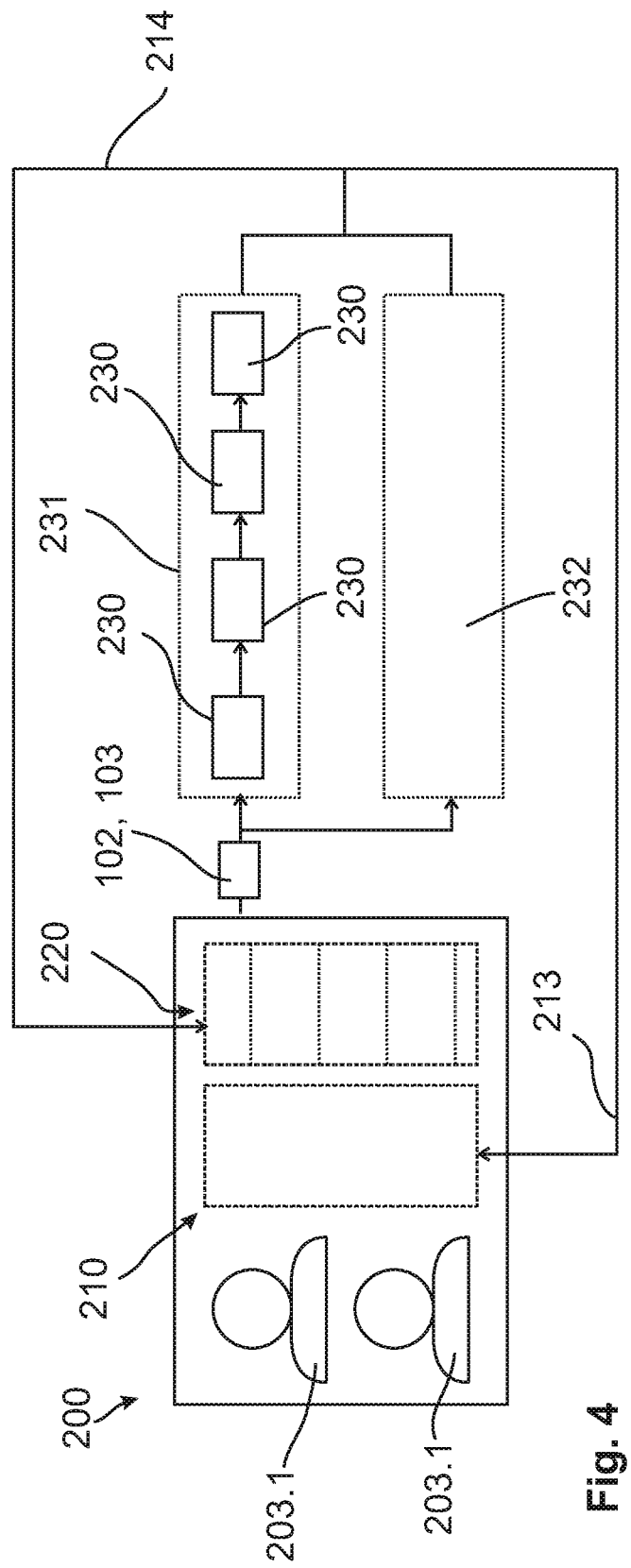
Figure 6:
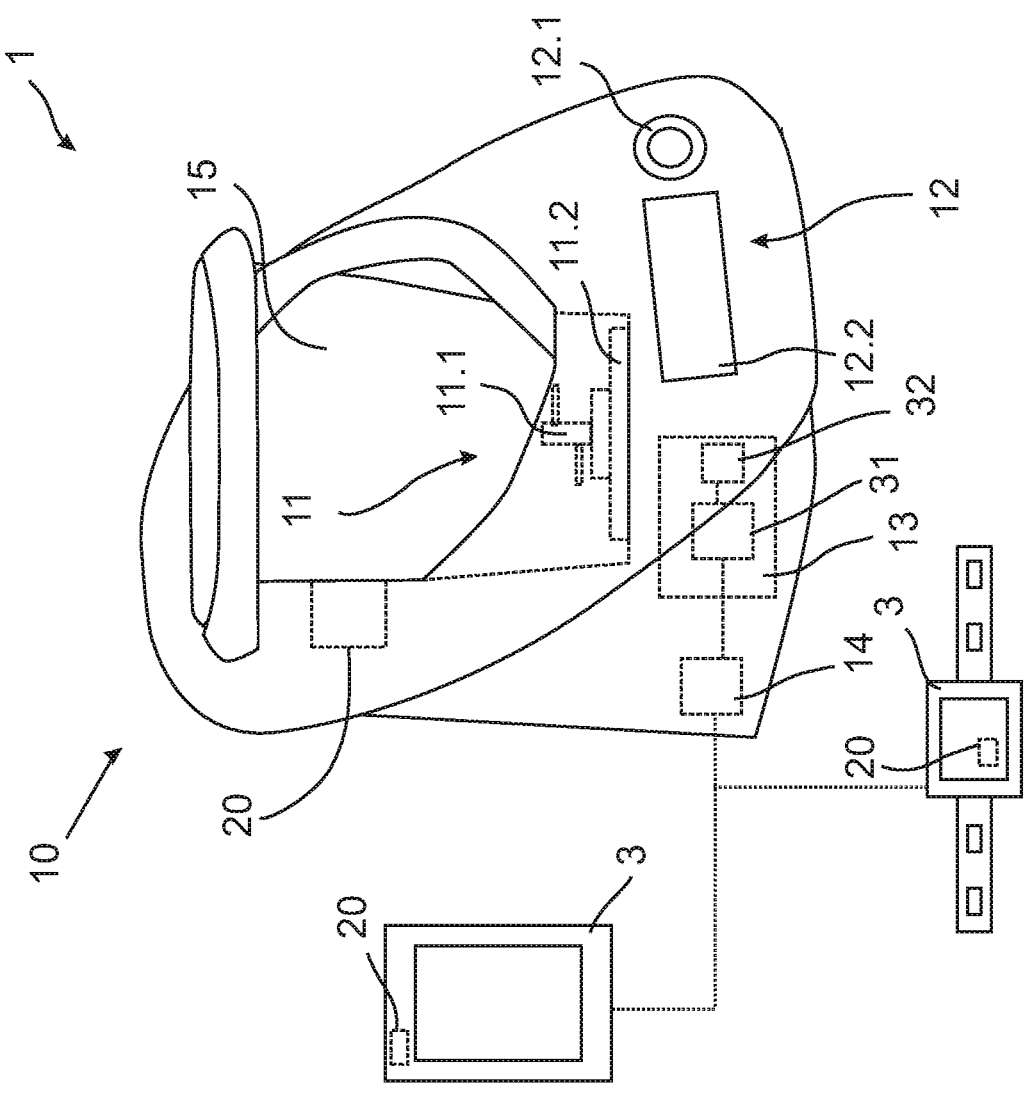
Figure 5:
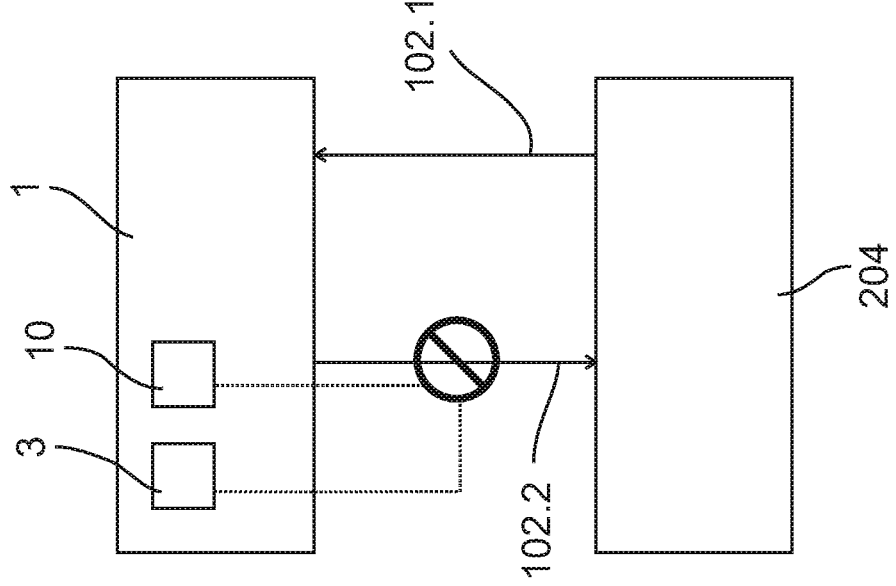

Further measures to improve the invention are described in the following description of some embodiments of the invention, which are shown schematically in the figures. All features and/or advantages arising from the claims, the description or the drawings, including individual constructional units, spatial arrangements and method steps, may be essential to the invention, both individually and in the most varied combinations. It should be noted that the figures are descriptive only and are not intended to limit the invention in any way. They are shown as:

FIG. 1 a system according to the invention for preparing food with a kitchen appliance in accordance with the invention in a first embodiment, FIG. 2 a method for generating at least one recipe suggestion when using the kitchen appliance of the first embodiment, FIG. 3 a behavioral pattern of a user profile during the method of the first embodiment, FIG. 4 a comparison of a data history of the user profile with other data histories during the method of the first embodiment, FIG. 5 a pattern of behavior of a user profile in a method according to the invention in a further embodiment and FIG. 6 a system according to the invention with a kitchen appliance according to the invention with a further embodiment.

In the following figures, the identical reference signs are used for the same technical characteristics even from different embodiments.

FIG. 1 shows a system 1 for the preparation of food according to the invention using a kitchen appliance 10 by which the food can be prepared, preferably at least partially automated. For this purpose, the kitchen appliance 10 has a functional unit 11 for processing ingredients 2. The functional unit 11 preferably comprises a mixer 11.1 and a heating element 11.2. Thus, the kitchen appliance 10 can provide a high degree of convenience for a user when preparing the food, if the user, for example, only puts the ingredients 2 into a cooking vessel 15 of the kitchen appliance 10 and the ingredients 2 in the cooking vessel 15 can be automatically chopped and/or heated to the correct temperature by the functional unit 11. The kitchen appliance 10 also has a user interface 12 for interaction with the user. Preferably, the user interface 12 shall include a control knob 12.1. and/or a display 12.2, preferably in the form of a touch display. This enables the user to transmit user commands to an integrated control unit 13 of the kitchen appliance 10. Preferably, the integrated control unit 13 can initiate and/or perform a method 100 according to the invention as shown in FIG. 2. The kitchen appliance 10 has an appliance interface 14 through which the kitchen appliance 10 can be in communication with a user device 3 and/or a server 30. For this purpose, the kitchen device 10 can be or is connected wirelessly or by cable to the server 30 and/or the user device 3. In particular, the kitchen appliance 10 can communicate with user device 3 and/or server 30 via the Internet. Thus, preferably the method 100 can be initiated by the integrated control unit 13 by sending food data 210 to the server 30 via the device interface 14, so that the food data 210 can be processed on the server 30 by a computing unit 31 of the server 30.

The method steps of method 100 are also shown schematically in FIG. 2. Preferably, a user profile 200 of the user is first recorded. This can be done, for example, by the user retrieving user profile 200 via user interface 12 on kitchen appliance 10. In order to protect user profile 200 from unauthorized access, it can be provided that login data, in particular a user name and/or password, may be required to access the user profile 200. In addition, method 100 includes the detection 102 of food data 210. Food data 210 can be detected on the kitchen appliance 10 by retrieving the food data 210 e.g. from a storage unit 32 of the server 30 or from user device 3. For example, food data 210 can be acquired when the user retrieves a recipe 221 via the user interface 12 of the kitchen appliance 10, which contains food data 210 accordingly. Furthermore, it is conceivable that the kitchen appliance 10 and/or the user device 3 has a sensor device 20 by which ingredients 2 can be determined to determine food data 210. Thus, the ingredients 2 can be detected, for example, when added to the cooking vessel 15 of the kitchen appliance 10. For this purpose, the sensor device 20 can detect e.g. a camera, an ultrasonic sensor, a radar sensor and/or a molecular sensor. In order to be able to assign the ingredients 2, the recorded data can be compared with reference data from storage unit 32. Furthermore, it is conceivable that the sensor device 20 is part of the user device 3 and has e.g. a camera and/or a barcode scanner. Thus, for example, the user can scan a barcode of a package of added ingredients 2 via the user device 3 so that the corresponding food data 210, which are assigned to the package, can be transmitted to the kitchen device 10 and/or the server 30. In particular, the detection 102 of the food data 210 can thus be performed by the detection 102.1 of a recipe 221 and/or by the identification 102.2 of ingredients 2. This is followed by the assignment 103 of the food data 210 to a data history 220 of the user profile 200. The data history 220 can be stored on the server 30, the integrated control unit 13 of the kitchen appliance 10 and/or the user unit 3. In particular, the data history 220 can include a sequence of recipes 221 that were selected or executed via user profile 200.

This is shown, for example, in FIG. 3. For example, user profile 200 can include user group 203, which forms a household. In particular, user group 203 can have two or more individual users 203.1 assigned to it, for whom data history 220 is assigned to user profile 200 either separately or together. Depending on data history 220, a behavior pattern 201 of user profile 200 is detected 104. Behavior pattern 201 can be assigned separately to each individual user 203.1 or to user group 203 as a whole. Upon detection 104 of behavior 201 of user profile 200, preferably a temporary pattern 204 is detected 104.1. Thus, within data history 220, for example, a time stamp can be assigned to each recipe 221 selected by the user at which time recipe 221 was performed or retrieved. In addition, further data acquisitions 106 can be performed in order to predict the behavior pattern 201 more accurately. In particular, data acquisition 106.1 of purchased ingredients 2 can be performed, which are considered when detecting 104 the behavior pattern 201. Furthermore, especially in the context of the time pattern 204 can also be recorded according to 106.2 external activities 212. It is conceivable, for example, that restaurant visits are also recorded in order to detect the behavior pattern 201. A particularly future ingredient planning 213 can also be recorded according to 106.3 and considered when detecting 104 the behavior pattern 201.

For example, as shown in FIG. 3, it is conceivable that on the first calendar day I the user retrieves a recipe 221 on the kitchen appliance 10 and continues cooking. On the second calendar day II, it is recorded that user group 203 eats out and therefore an external activity 212 is present, whereby preferably the ingredients 2 used in external activity 212 are also entered in data history 220. On the third calendar day III it is determined that user group 203 is using a recipe 221 of kitchen appliance 10, but at different times. In addition, individual users 203.1 of user group 203 have created an ingredient plan 213 for user profile 200 for calendar days IV and V, whose recipes 221 are to be prepared in the following days. Ingredient planning 213 can, for example, be taken from a shopping list or a shopping list can be created using ingredient planning 213. In particular, you can use ingredient planning 213 to see which ingredients 2 the user group 203 purchases and which ingredients 2 are expected to have unprocessed remains. Furthermore, the detection 104 of the behavior pattern 201 can preferably include vital data 205 of user group 203. The vital data 205 can, for example, include the age of the individual user 203.1. Furthermore, an identification 202 of the kitchen appliance 10 and/or the user device 3 can be provided, e.g. to determine a location of the kitchen appliance 10. Thus, the identification 202 of the kitchen appliance 10 can also be used to detect 104 the behavior pattern 201. Additionally or alternatively, it can be provided that the identification 202 of the kitchen appliance 10 is used to detect 101 the user profile 200 and thus for verification. Preferably, the time pattern 204 can also be compared with calendar data 211 of at least one of the users. In this way it can be determined, for example, whether the preparation of certain dishes is connected with certain appointments of the users. For example, it can be determined whether a user prefers protein-containing food after sports activities. Depending on the behavior pattern, a determination 105 of at least one recipe suggestion 230 is also performed. Various data, such as vital data 205, calendar data 211, especially for future appointments, ingredient planning and/or the like can be considered when determining 105 the recipe suggestion 230. Preferably, several recipe suggestions 230 are determined depending on the behavior pattern 201. In particular, the several recipe suggestions 230 can be combined in a suggestion list 232 which comprises a defined recipe sequence 231 and is assigned to user profile 200. In particular, the suggestion list 232 can be configured dynamically depending on the changing data history 220 and/or changing behavior pattern 201, whereby, for example, individual recipe suggestions 230 can be moved and/or replaced within recipe sequence 231. The suggestion list 232 gives the user the possibility to better plan future recipes, e.g. for one week, and to buy them, and also to try out new recipes 221.

Preferably, when detecting 104 of the behavior pattern 201 and/or determining 105 of the at least one recipe suggestion 230 according to FIG. 4, a comparison of the data history 220 with at least one further data history 222 assigned to a further user profile 200 can be performed. The further user profiles 200 may in particular be stored on the server 30, thereby providing indications as to how users or user groups 203 of other user profiles 200 have behaved, e.g. with similar preferences with regard to ingredients 2 and/or external bound activities 212, and/or with similar vital data 205. This can be used to more precisely determine the behavior pattern 201 and/or predict the recipe suggestion 230 more precisely.

FIG. 5 also shows a behavior pattern 201 with a user profile 200 in another embodiment. A data history 220 of user profile 200 shows that the user has retrieved different recipes 221.1, 221.2 and has already used at least one of recipe 221.1 several times, which is reflected in a repetition 201.1 of recipe 221.1. Furthermore, an ingredient planning 213 of user profile 200 shows that the user plans another repetition 201.1 of recipe 221.1. Consequently, it can be assumed that the repeated recipe 221.1 is a recipe 221 preferred by the user so that it is considered when determining 105 a recipe suggestion 230 and/or when detecting 104 of behavior pattern 201. In particular, recipe suggestion 230 can, for example, include recipe 221 similar to repeated recipe 221.1.

FIG. 6 shows a system 1 according to the invention for preparing food with a kitchen appliance 10 for preparing food in a further embodiment. In this case, a method 100 can be performed essentially according to the first embodiment, but the kitchen appliance 10 according to FIG. 6 has a storage unit 32 and a computing unit 31, which are part of an integrated control unit 13 of the kitchen appliance 10. Preferably, the method 100, as shown in FIGS. 2 to 4, can thereby be performed completely on the kitchen appliance 10 or the integrated control unit 13 of the kitchen appliance 10, respectively. In addition or alternatively, the integrated control unit 13 of the kitchen appliance 10 can be in communication with a user unit 3 via an interface 14 of the kitchen appliance 10 and/or can be in communication with a user unit 3 in order to exchange food data 210. In addition or alternatively, it may be possible, particularly at the user's option, to control the integrated control unit 13 via a user interface 12.

Furthermore, it is conceivable that food data 210 can be recorded by a sensor device 20 of the user device 3 and/or the kitchen device 10 in order to be processed on the integrated control unit 13. In particular, the kitchen appliance 10 can do without an Internet connection if the method 100 can be completely executed on the integrated control unit 13. Furthermore, the kitchen appliance 10 can be put into operation independently of the Internet connection so that a user can use its functions completely and in particular autonomously directly after purchasing the kitchen appliance 10.

The above explanation of the embodiments describes the present invention exclusively within the scope of examples. Of course, individual features of the embodiments can be freely combined with each other, if technically reasonable, without leaving the scope of the present invention.

LIST OF REFERENCE SIGNS

1 System
2 Ingredients
3 User device
10 Kitchen Appliance
11 Functional unit
11.1 Mixer
11.2 Heating element
12 User interface
12.1 Control knob
12.2 Display
13 Control unit
14 Device interface
15 Cooking vessel
20 Sensor device
30 Server
31 Computing unit
32 Storage unit
100 Method
101 Detecting from 200
102 Detecting of 210
102.1 Detecting from 221
102.2 Identifying 2
103 Assign from 210 to 220
104 Detection of 201
105 Determine 230
106 Further data detection
106.1-3 Detecting data
107 Provision of 230
200 User profile
201 Behavior pattern
202 Identification of 10
203 User group
203.1 Single user from 203
204 Time pattern
205 Vital data
210 Food product data
211 Calendar data
212 External activities
213 Ingredient Planning
220 Data history
221 Recipe 222 additional data history
230 Recipe suggestion
231 Recipe sequence
232 Suggestion list
I-V Calendar days

The invention claimed is:

1. A method for generating at least one recipe suggestion when using a kitchen appliance for preparing food, the method comprising:
Detection of food data,
Assigning the food data to a data history of a user profile,
Detection of a behavior pattern of the user profile depending on the data history,
Determination of at least one recipe suggestion depending on the behavior pattern, and
Provision of at least one recipe suggestion on the kitchen appliance,
wherein the detection of the behavior pattern of the user profile comprises detection of repetitions in the data history, wherein the repetitions refer to:
individual recipes, so that a user's preferred recipes are detected,
if the user repeats the recipes several times within a certain period of time, or
if a recipe has more repetitions than another recipe, and
pattern data of at least ingredients or products, so that a repeated use of a specific recipe type leads to the user being presented with more suggestions of the specific recipe type.

2. The method according to claim 1,
wherein,
the detection of at least the behavior pattern or the determination of the recipe suggestion comprises a comparison of the data history with at least one further data history assigned to at least one further user profile.

3. The method according to claim 1,
wherein,
several recipe suggestions are determined as a function of the behavior pattern or wherein one of the recipe suggestions is automatically selected and provided on the kitchen appliance.

4. The method according to claim 3,
wherein,
the recipe suggestions are assigned to the user profile in a suggestion list, or
in that the user profile comprises an identification of at least the kitchen appliance or a user device or in that a user group is assigned to the user profile.

5. The method according to claim 1,
wherein,
the detection of the behavior pattern of the user profile comprises a detection of a time pattern, and the recipe suggestion is determined as a function of the time pattern.

6. The method according to claim 1,
wherein,
the user profile comprises vital data of a user, the vital data being considered at least when detecting the behavior pattern or when determining the recipe suggestion.

7. The method according to claim 1,
wherein,
the method comprises the following step:
Recording of purchased ingredients,
whereby the purchased ingredients are considered at least during the detection of the behavior pattern or when determining the at least one recipe suggestion, or
that the method comprises the following step:
Recording of the external activities,
whereby the external activities are considered at least during the detection of the behavior pattern or in the determination of the at least one recipe suggestion, or
that the method comprises the following step:
Recording ingredient planning,
wherein the ingredient planning is considered at least during the detection of the behavior pattern or determining the at least one recipe suggestion.

8. The method according to claim 1,
wherein,
the detection of food data comprises at least a detection of a recipe or an identification of ingredients supplied to the kitchen appliance.

9. A kitchen appliance for preparing food comprising:
a functional unit for processing the ingredients, and
a user interface for interaction with a user,
wherein,
the user interface is connected to an integrated control unit by means of which a method for generating at least one recipe suggestion when using a kitchen appliance for preparing food, the method comprising:
Detection of food data,
Assigning the food data to a data history of a user profile,
Detection of a behavior pattern of the user profile depending on the data history,
Determination of at least one recipe suggestion depending on the behavior pattern, and
Provision of at least one recipe suggestion on the kitchen appliance,
wherein the detection of the behavior pattern of the user profile comprises detection of repetitions in the data history, wherein the repetitions refer to:
individual recipes, so that a user's preferred recipes are detected,
if the user repeats the recipes several times within a certain period of time, or
if a recipe has more repetitions than another recipe, and
pattern data of at least ingredients or products, so that a repeated use of a specific recipe type leads to the user being presented with more suggestions of the specific recipe type.

10. A System for preparing food comprising:
a kitchen appliance for preparing food with a functional unit for processing ingredients and a user interface for interaction with a user,
a storage unit in which a data history of a user profile with food data can be stored, and
a computing unit which is configured to detect a behavior pattern of the user profile as a function of the data history and to determine at least one recipe suggestion as a function of the behavior pattern, so that the at least one recipe suggestion can be provided on the kitchen appliance,
wherein the detection of the behavior pattern of the user profile comprises detection of repetitions in the data history, wherein the repetitions refer to:

individual recipes, so that a user's preferred recipes are detected,
> if the user repeats the recipes several times within a certain period of time, or
> if a recipe has more repetitions than another recipe, and
>> pattern data of at least ingredients or products, so that a repeated use of a specific recipe type leads to the user being presented with more suggestions of the specific recipe type.

11. The system according to claim 10,
wherein,
a sensor device is provided by which ingredients used to determine the food data can be determined.

12. The system according to claim 11,
wherein,
the sensor device comprises at least one of the following sensors:
Camera,
Bar code scanner,
Ultrasonic sensor,
Radar sensor, and
Molecular sensor.

13. The system according to claim 12,
wherein,
the sensor device is integrated at least into the kitchen appliance or into a user device.

14. The system according to claim 10,
wherein,
at least the computing unit or the storage unit for collecting food data is in communication with a further kitchen appliance, or
in that a server comprises the computing unit or the storage unit.

15. The system according to claim 10,
wherein,
the kitchen appliance has at least an appliance interface by means of which the kitchen appliance is in communication with the computing unit or the storage unit.

16. The system according to claim 10,
wherein,
the computing unit is configured to provide the at least one recipe suggestion available to a user device via a communication connection.

\* \* \* \* \*